United States Patent [19]
Goder

[11] Patent Number: 6,127,814
[45] Date of Patent: Oct. 3, 2000

[54] SYSTEM TO PROTECT SWITCH MODE DC/DC CONVERTERS AGAINST OVERLOAD CURRENT

[75] Inventor: Dimitry Goder, San Jose, Calif.

[73] Assignee: Switch Power, Inc., Campbell, Calif.

[21] Appl. No.: 09/198,168

[22] Filed: Nov. 23, 1998

[51] Int. Cl.[7] .................................................. G05F 1/575
[52] U.S. Cl. .................................................... 323/282
[58] Field of Search ................................... 323/282, 284, 323/351

[56] References Cited

U.S. PATENT DOCUMENTS

| | | | |
|---|---|---|---|
| 3,733,536 | 5/1973 | Gillow et al. | 321/10 |
| 3,768,012 | 10/1973 | Wilkinson | 324/127 |
| 4,293,812 | 10/1981 | Kubach et al. | 323/272 |
| 4,316,136 | 2/1982 | Saxarra et al. | 323/282 |
| 4,929,882 | 5/1990 | Szepesi | 323/285 |
| 5,465,201 | 11/1995 | Cohen | 363/21 |
| 5,734,259 | 3/1998 | Sisson et al. | 323/282 |
| 5,770,940 | 6/1998 | Goder | 323/282 |
| 5,877,611 | 3/1999 | Brkovic | 323/282 |
| 5,939,871 | 8/1999 | Tanaka | 323/285 |
| 5,955,872 | 9/1999 | Grimm | 323/284 |
| 5,959,443 | 9/1999 | LittleField | 323/284 |
| 5,982,160 | 11/1999 | Walters et al. | 323/282 |

*Primary Examiner*—Jeffrey Sterrett
*Attorney, Agent, or Firm*—Flehr Hohbach Test Albritton & Herbert LLP

[57] ABSTRACT

A method and circuit arrangement for sensing the output current in a switch mode power converter in order to provide protection arrangements which are responsive to overload or short circuit conditions. In a switch mode power converter including an inductor for providing output current to a load circuit, the inductor having an inherent resistance, a filter circuit is coupled to both the first terminal of the inductor and to the second terminal of the inductor. The filter circuit provides the DC component of the voltage across the inherent resistance of the inductor to an error amplifier. The error amplifier provides an output signal representing the output current, and the output signal is used to adjust an operating parameter of the switching circuit, e.g. duty cycle.

27 Claims, 3 Drawing Sheets

SYSTEM TO PROTECT SWITCH MODE DC/DC CONVERTERS AGAINST OVERLOAD CURRENT

FIELD OF THE INVENTION

This invention relates to switch mode converters, and in particular to protection arrangements employing output current sensors in switch mode converters.

BACKGROUND OF THE INVENTION

Although power supply circuits are commonly regulated, regulation arrangements are typically not able to provide adequate protection against overload or short circuit conditions. Therefore, it is common to design such circuits to include protection arrangements which may be responsive to output (or input) current sensing. In addition, many current sharing approaches employed to provide multiple converters in parallel require output current sensing.

A challenge in designing such current sensing arrangements involves the selection of suitable current sense elements. For example, a current sense resistor can provide excellent accuracy, and is simple and inexpensive to use. However, current sense resistors dissipate power and reduce the efficiency of the power converter circuit. This is particularly important in the design of modern low voltage output/high current output applications. A second example, a current sense transformer, does not affect the efficiency of the power converter, but can deliver only AC information, is complicated to use and is costly.

It is common to place an inductor in series with the output of a power supply to provide filtering. Power inductors are known to have parasitic (or inherent) resistance, and therefore can be represented by an equivalent circuit of a series combination of an ideal inductor and a resistor. When direct current (DC) flows through the inductor (or a current having a DC component), a DC voltage drop is imposed across the inductor, which voltage is a product of the magnitude of the DC (component of the) current and the parasitic resistance of the inductor. The DC voltage drop across the inductor can then be sensed to provide information about current flowing through the inductor. Since such an inductor may already be present in the circuit, there would normally not an additional loss of efficiency in using the inductor for this purpose.

U.S. Pat. No. 5,465,201 (the '201 patent), issued to Cohen, discloses an overload protection arrangement for switch mode power converters. U.S. Pat. No. 5,465,201 is incorporated herein by reference. The protection arrangement includes an output stage in which an inductor is connected in series with the load, and provides an output current to the load. The inductor has an inherent resistance, and the output current is sensed by measuring a DC voltage. The DC voltage is compared with a reference voltage to provide an error signal which can modulate either the frequency of operation of the converter, or its duty cycle, or both. Furthermore, as the temperature of the output inductor rises, its inherent resistance rises also. The rise in inherent resistance of the output inductor leads to a further change of the DC voltage developed across the output inductor.

FIG. 1 is the circuit of FIG. 4 from the '201 patent. This circuit is described beginning at column 4, line 27 of the '201 patent. In the circuit of FIG. 4 of the '201 patent, it can be seen that there is a connection to a first terminal of the inductor 116 (including the inherent resistance 118) which is opposite the connection to the load 122, i.e. at the junction of the inductor 116, the anode of the diode 114, and the secondary winding 106. However, the reference for the measurement of the voltage across the inductor 116 is the ground connection to the voltage reference $V_{REF1}$ 128, and the only reference to the second terminal of the inductor 116 (including the inherent resistance 118) is through the load 122 and capacitor 120, back through the diode 112, the transformer 102, and $V_{in}$ 100 to ground. However, since transformers do not pass DC, the DC reference to ground is lost. Hence, the DC voltage measured by the RC filter consisting of the resistor 124 and capacitor 126 is not measured directly across the series inductor 116. It can be seen that in each of the circuits disclosed in the '201 patent, the voltage measured by the sensing circuit is likewise not the DC voltage directly across a series inductor.

Therefore, there is a need for a suitable means of sensing the output current in a switch mode power converter in order to provide protection arrangements which are responsive to overload or short circuit conditions.

SUMMARY OF THE INVENTION

The present invention provides a method and circuit arrangement for sensing the output current in a switch mode power converter in order to provide protection arrangements which are responsive to overload or short circuit conditions.

In a first aspect, the invention provides a switch mode power converter comprising an input voltage source; a switching circuit for coupling the input voltage source and an output stage; the output stage comprising an inductor for providing output current to a load circuit, the inductor having a first terminal and a second terminal, the second terminal for coupling to the load circuit, the inductor having an inherent resistance, the output current thereby providing a voltage between the first terminal of the inductor and the second terminal of the inductor including a DC voltage component proportional to the inherent resistance of the inductor and to the output current; a filter circuit having a filter input and a filter output, the filter input coupled to the first terminal of the inductor and to the second terminal of the inductor, the filter circuit providing the DC voltage component at the filter output; and error amplification means responsive to the DC voltage component, the error amplification means providing an output signal representing the output current, the output signal adjusting an operating parameter of the switching circuit.

In a second aspect, the invention provides an overload protection system for use in a switch mode power converter, the switch mode converter including an input voltage source, a switching circuit for coupling the input voltage source and an output stage, the output stage comprising an inductor for providing output current to a load circuit, the inductor having a first terminal and a second terminal, the second terminal for coupling to the load circuit, the inductor having an inherent resistance, the output current thereby providing a voltage between the first terminal of the inductor and the second terminal of the inductor including a DC voltage component proportional to the inherent resistance of the inductor and to the output current; the protection system comprising a filter circuit having a filter input and a filter output, the filter input coupled to the first terminal of the inductor and to the second terminal of the inductor, the filter circuit providing the DC voltage component at the filter output; and error amplification means responsive to the DC voltage component, the error amplification means providing an output signal representing the output current, the output signal adjusting an operating parameter of the switching circuit.

In a third aspect, the invention provides a method of providing output current sensing in a switch mode power converter circuit having an input voltage source, a switching circuit for coupling the input voltage source and an output stage, the output stage comprising an inductor for providing output current to a load circuit, the inductor having a first terminal and a second terminal, the second terminal for coupling to the load circuit, the inductor having an inherent resistance, the output current thereby providing a voltage between the first terminal of the inductor and the second terminal of the inductor including a DC voltage component proportional to the inherent resistance of the inductor and to the output current, the method comprising the steps of providing a filter circuit having a filter input and a filter output, the filter input coupled to the first terminal of the inductor and to the second terminal of the inductor, the filter circuit providing the DC voltage component at the filter output; and providing error amplification means responsive to the DC voltage component, the error amplification means providing an output signal representing the output current, the output signal adjusting an operating parameter of the switching circuit.

In a preferred embodiment, the filter circuit comprises a first resistor coupled between the first terminal of the inductor and a first terminal of a capacitance, and a second resistor coupled between the second terminal of the inductor and a second terminal of the capacitance, the filter output being provided across the two terminals of the capacitance. In one embodiment, The capacitance of the filter circuit includes a capacitor coupled between the first terminal of the capacitance and the second terminal of the capacitance. In another embodiment, the capacitance of the filter circuit includes a first capacitor coupled between the first terminal of the capacitance and ground, and a second capacitor coupled between the second terminal of the capacitance and ground. The filter circuit may include offset means to offset the DC voltage component at the filter output by a predetermined amount.

In another embodiment, the filter circuit comprises a resistor coupled between the first terminal of the inductor and a first terminal of a capacitance, with a second terminal of the capacitance coupled to a voltage reference. The second terminal of the inductor is coupled to ground, as is the voltage reference. The filter output is provided between the first terminal of the capacitance and ground. This embodiment is similar to that illustrated in FIG. 4 of the '201 patent, with the addition of a ground connection to the second terminal of the inductor, including the inherent resistance.

DETAILED DESCRIPTION OF THE INVENTION

Figure 1:
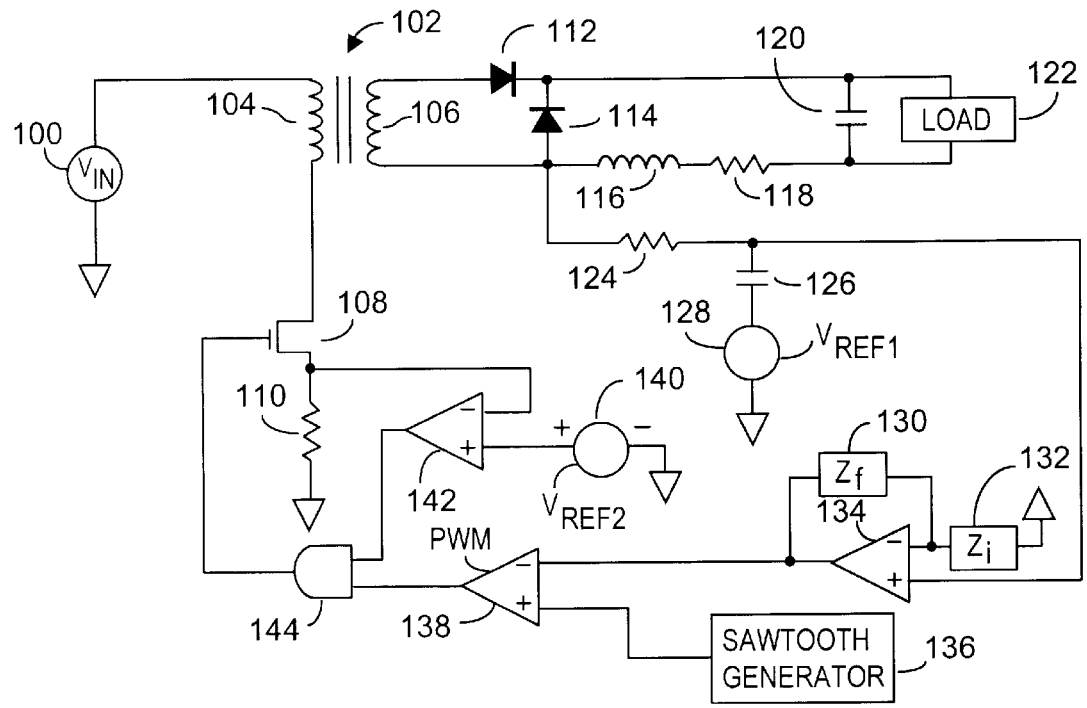
FIG. 1 is the circuit of FIG. 4 from U.S. Pat. No. 5,465,201.
Figure 2:
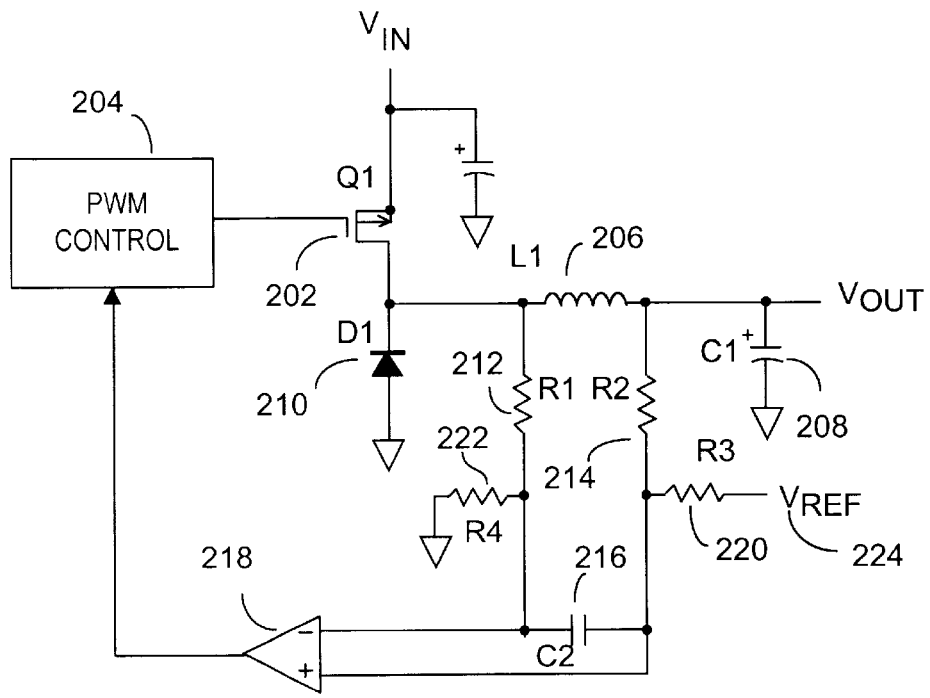
FIG. 2 is a circuit diagram of an embodiment of a switch mode power supply circuit including output current sensing according to the invention.

FIG. 2 is a circuit diagram of a switch mode power supply circuit 200 including output current sensing according to the invention. The power supply is a step-down or buck regulator used to convert a higher input voltage to a lower output voltage. A transistor Q1 202 acts as a main switch, and is driven by a pulse width modulation (PWM) control 204 coupled to the gate of transistor Q1 202. Transistor Q1 202 turns on and off in response to the output of the PWM control 204, outputting a square wave. The square-wave is filtered by an LC filter formed by an inductor L1 206 having a first terminal coupled to the drain of the transistor Q1 202, and a second terminal coupled to the load (not illustrated), and a capacitor C1 208 coupled between the second terminal of inductor L1 206 and ground. Although not illustrated, inductor L1 206 has a small, inherent resistance. A freewheeling diode D1 210, coupled between the drain of transistor Q1 202 and ground, provides a current path during the time transistor Q1 202 is turned off.

A filter circuit comprised of an R-C-R network forms a low-pass filter. The filter circuit is formed by resistors R1 212 and R2 214 coupled between the first and second terminals, respectively, of inductor L1 206, and first and second terminals, respectively, of a capacitor C2 216. The first and second terminals of capacitor C2 216 are also coupled to inverting and non-inverting inputs, respectively, of an overcurrent detector amplifier 218.

The filter circuit comprised of resistor R1 212 and R2 214, and capacitor C2 216 extracts the DC voltage present across inductor L1 206. An offset resistor R3 220 is coupled between the second terminal of capacitor C2 216 and a voltage reference $V_{REF}$ 224, and a second offset resistor R4 222 is coupled between the first terminal of capacitor C2 216 and ground. Offset resistors R3 220 and R4 222 thereby establish an initial voltage offset across capacitor C2 216. This offset forces the current detector amplifier 218 to be in the off-state with a normal current through inductor L1 206, i.e. with a DC voltage across inductor L1 206 below a predetermined level (corresponding to the DC offset). As the current increases through inductor L1 206, the DC voltage drop across inductor L1 206 increases, thereby reducing the voltage across capacitor C2 216. When the voltage across capacitor C2 216 is reduced to zero, the output of the overcurrent detector amplifier 218 causes the PWM control 204 to limit output current.

Those skilled in the art are familiar with methods to control the output current. For example, the analog output from the overcurrent detector amplifier 218 may be used directly by the PWM control 204 to control the duty cycle of transistor Q1 202. If a comparator were used in place of the overcurrent detector amplifier 218, the discrete, on/off output of the comparator could be used to block the control signal to transistor Q1 202, e.g. by inserting an AND gate in the circuit.

The values of offset resistors R3 220 and R4 222 may be selected to make the initial offset a constant voltage which is independent of the output voltage. This results in a current limit threshold that does not depend upon the output voltage and will limit the output current at the same value whether during start up, in the event short circuit, or in response any other condition which causes the output to change. Alternatively, the values of offset resistors R3 220 and R4 222 may instead be selected to provide a fold-back current limit, i.e. to reduce the current limit in an overload or short condition.

Figure 3:
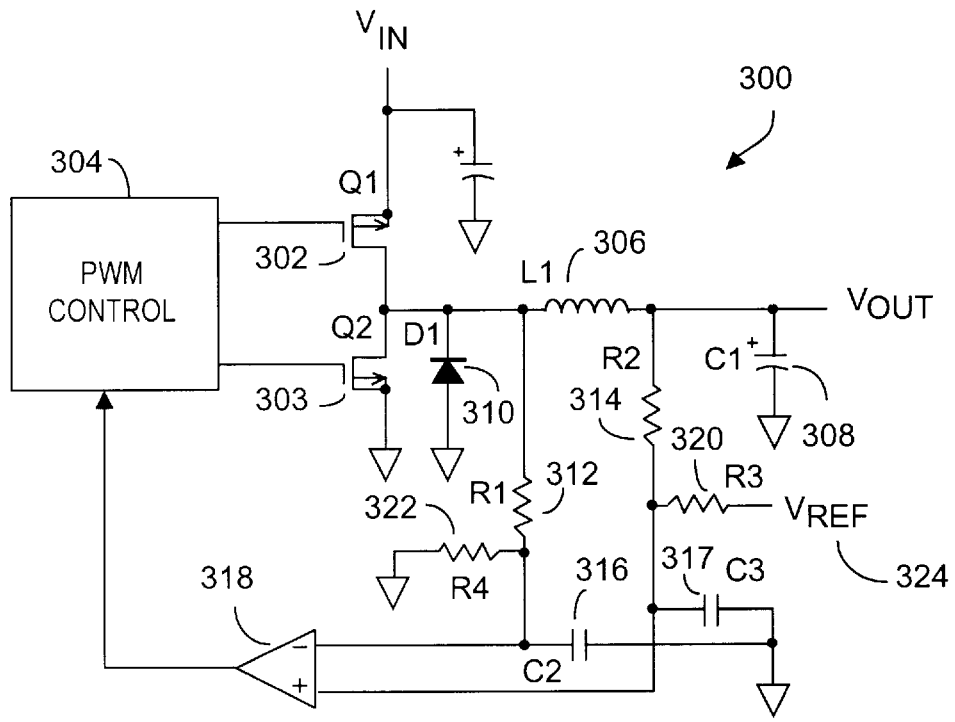
FIG. 3 is a circuit diagram of a second embodiment of a switch mode power supply circuit including output current sensing according to the invention.

FIG. 3 is a circuit diagram of a second embodiment of a switch mode power supply circuit 300 including output current sensing according to the invention. The circuit components shown in FIG. 2 all have reference numerals beginning in "2". Circuit components shown in FIG. 3 all have reference numerals beginning in "3", and those components which perform functions similar to functions performed by corresponding components shown in FIG. 2, are identified by corresponding reference numerals, e.g. the PWM control has reference numeral 204 in FIG. 2 and reference numeral 304 in FIG. 3. Circuit components shown in FIGS. 4 and 5, discussed below, likewise have reference numerals beginning in "4" and "5", respectively, and components which perform functions similar to functions performed by corresponding components shown in FIG. 2.

The power supply circuit 300 in FIG. 3 is similar to that shown in FIG. 2. However, the power supply circuit 300 in FIG. 3 includes a filter circuit which comprises two R-C filters rather than a single R-C-R filter. In FIG. 3, a filter formed by resistor R1 312 and capacitor C2 316 averages the voltage at the first terminal of inductor L1 306, and a filter formed by resistor R2 314 and capacitor C3 317 averages the voltage at the second terminal of inductor L1 306. The overcurrent detector amplifier 318 compares the difference between these two DC voltages. Resistors R3 320 and R4 322 establish an initial offset.

The power supply circuit 300 in FIG. 3 includes a second transistor Q2 303.

In this arrangement, transistor Q2 303 is a synchronous rectifier and is used in place of a diode to improve efficiency of the power converter. The inclusion of transistor Q2 303 does not affect the output current sensing arrangement. This demonstrates how the invention may be used in a variety of power converter designs.

Figure 4:
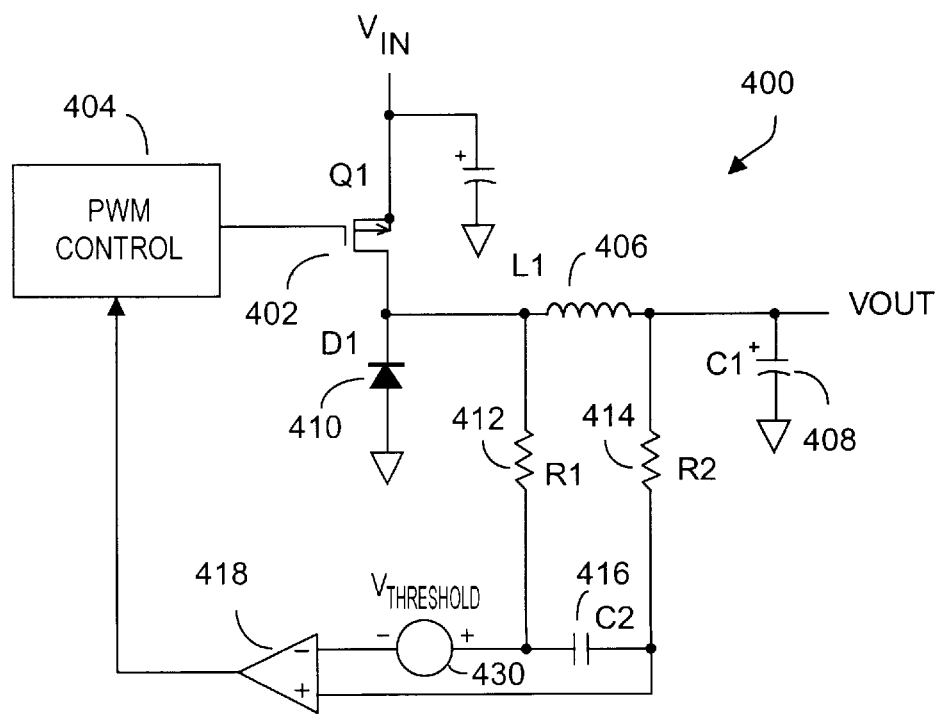
FIG. 4 is a circuit diagram of a third embodiment of a switch mode power supply circuit including output current sensing according to the invention.

FIG. 4 is a circuit diagram of a third embodiment of a switch mode power supply circuit 400 including output current sensing according to the invention. The power supply circuit 400 in FIG. 4 is similar to that shown in FIG. 2, except that the power supply circuit 400 in FIG. 4 includes a single RC filter comprised of resistor R1 412 and capacitor C2 416. The filter extracts the DC voltage present across present inductor L1 406. The terminals of capacitor C2 416 are coupled to the inverting and non-inverting inputs of the differential amplifier 418. A threshold voltage reference, $V_{THRESHOLD}$ 430, is coupled between one of the terminals of capacitor C2 416 and one input to the differential amplifier 418. As illustrated in FIG. 4, $V_{THRESHOLD}$ 430 is coupled to the inverting input of the differential amplifier 418. $V_{THRESHOLD}$ 430 establishes a fixed initial offset voltage.

Figure 5:
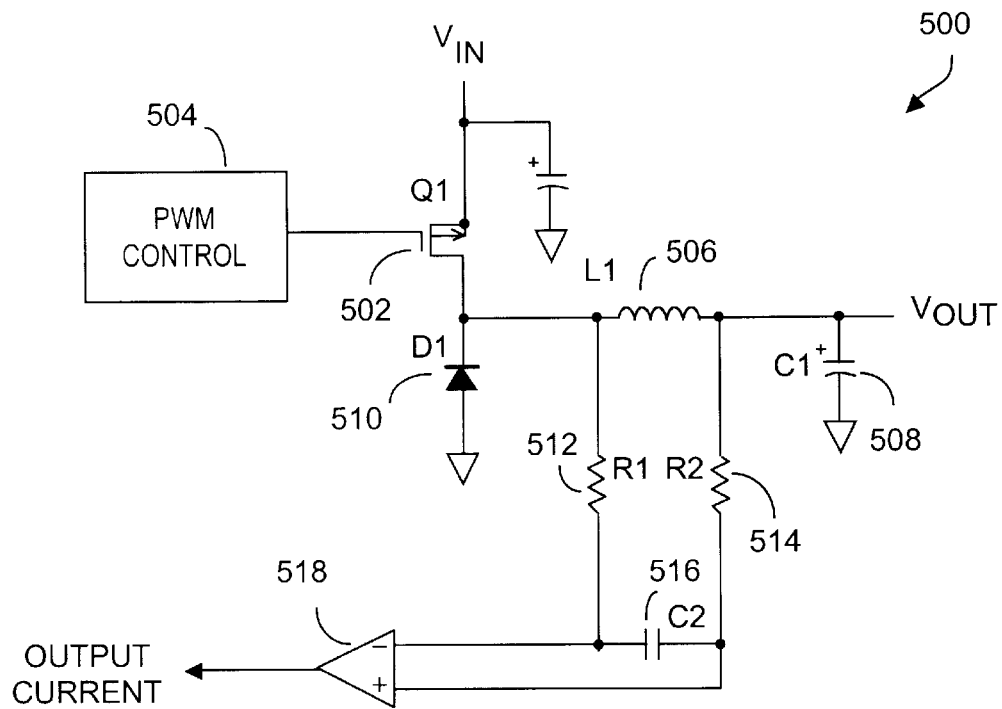
FIG. 5 is a circuit diagram of a fourth embodiment of a switch mode power supply circuit including output current sensing according to the invention.

FIG. 5 is a circuit diagram of a fourth embodiment of a switch mode power supply circuit 500 including output current sensing according to the invention. However, the output current sensing arrangement illustrated in FIG. 5 may be used for a purpose other than feeding back to control the PWM, and hence the output current. The power supply circuit 500 in FIG. 5 includes an R-C-R network formed by resistors R1 512 and R2 514 coupled between the first and second terminals, respectively, of inductor L1 506, and first and second terminals, respectively, of capacitor C2 516. The first and second terminals of capacitor C2 516 are also coupled to the inverting and non-inverting inputs, respectively, of the differential amplifier 518.

The output of the differential amplifier 518 could be feed back to the PWM control 504, as illustrated in FIGS. 2, 3 and 4. However, the output of the differential amplifier 518 is shown not coupled to the PWM control 504, but rather available for other purposes, e.g. to provide output current related information elsewhere in the circuit.

Figure 6:
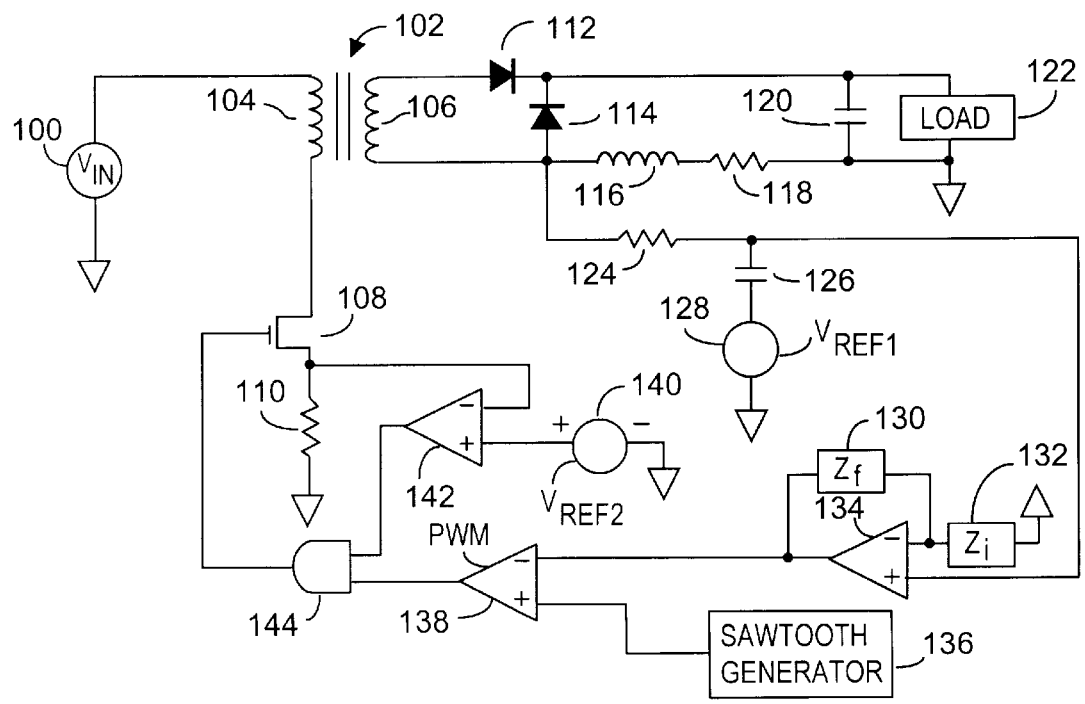
FIG. 6 is the circuit of FIG. 4 from U.S. Pat. No. 5,465,201 modified with output current sensing according to the invention.

FIG. 6 is the circuit of FIG. 4 from U.S. Pat. No. 5,465,201 modified with output current sensing according to the invention. In the circuit 600 of FIG. 6, there is a ground connection 146 to the second terminal of the inductor 116 (including the inherent resistance 118). This overcomes the deficiency in the prior art circuit described above.

In each of the embodiments of the present invention, a filter circuit senses a DC voltage which is representative of the output current. As indicated above, as the temperature of the output inductor rises, its inherent resistance rises also. The rise in inherent resistance of the output inductor leads to a further change of the DC voltage developed across the output inductor. Thus, the DC voltage sensed by the filter circuit is also proportional to a temperature within the switch mode power supply.

It will be readily apparent to a person skilled in the art that numerous modifications and variations of the embodiments of the present invention are possible in light of the above teachings. For example, as discussed above, a comparator may be used in place of the overcurrent detector (differential) amplifier 218, 318, 418, 518. A DC reference may be used to set an initial offset in place of resistors R3 220, 320 and R4 222, 322. Embodiments of the invention herein are shown in a step-down or buck regulator. The invention may also be applied to other converter topologies, e.g. boost regulators, flyback converters, push-pull converters, and the like.

It is therefore to be understood that, within the scope of the appended claims, the invention may be practiced other than as specifically described herein.

I claim:

1. A switch mode DC:DC converter having an input node coupleable to a source of potential Vin and having an output node providing an output potential Vo and an output current, comprising:

an inductor having a first inductor node and a second inductor node and an inherent resistance therebetween;

a switch, having a control node, coupled to said converter so as to switchingly control current flow from said input node to said inductor; and means for sensing solely from DC signal components present at said first inductor node and at said second inductor node a measure of said output current and for outputting to said control node a signal proportional to said measure.

2. The DC:DC converter of claim 1, wherein said means for sensing and for outputting senses said measure solely from DC-coupled signals available at said first inductor node and at said second inductor node.

3. The DC:DC converter of claim 1, wherein said means for sensing and for outputting includes:

a switch control circuit having an output coupled to said control node so as to control operation of said switch;

a sense circuit coupled differentially across said first inductor node and across said second inductor node to extract from a difference in DC-components in signals therebetween said measure of said output current, said sense circuit outputting said signal proportional to said measure.

4. The DC:DC converter of claim 1, wherein said means for sensing and for outputting includes:

a switch control circuit having an output coupled to said control node so as to control operation of said switch;

a first low pass filter coupled to said first inductor node;

a second low pass filter coupled to said second inductor node; and a sense circuit, coupled differentially across an output of said first low pass filter and an output of said second low pass filter to extract from a difference in voltage signals therebetween said measure of said output current, said sense circuit outputting said signal proportional to said measure to an input node of said switch control circuit.

5. The DC:DC converter of claim 1, wherein said sense circuit includes: a difference amplifier having an output coupled to said input node of said sense circuit;

a first low pass filter coupled between said first inductor node and a first input node of said difference amplifier;

a second low pass filter coupled between said second inductor node and a second input node of said difference amplifier;

wherein said difference amplifier outputs said measure of output current.

6. The DC:DC converter of claim 1, wherein:

said second inductor node is coupled to ground potential.

7. The DC:DC converter of claim 1, wherein said signal proportional to said measure produces a variation in a duty cycle parameter of said switch.

8. The DC:DC converter of claim 1, wherein said measure of said output current is proportional to an internal temperature of said DC:DC converter.

9. The DC:DC converter of claim 1, wherein said means for sensing and for outputting includes a passive low-pass filter having a first filter input coupled to said first inductor node, and a second filter input coupled to said second inductor node.

10. The DC:DC converter of claim 9, wherein said passive low-pass filter includes:

a first resistor having a first lead coupled to said first inductor node;

a second resistor having a first lead coupled to said second inductor node; and a capacitor coupled between a second lead of said first resistor and a second lead of said second resistor.

11. The DC:DC converter of claim 9, wherein said passive low-pass filter includes:

a first resistor having a first lead coupled to said first inductor node and having a second lead coupled to a first lead of a first capacitor;

a second resistor having a first lead coupled to said second inductor node and having a second lead coupled to a first lead of a second capacitor.

12. The DC:DC converter of claim 1, further including:

means for offsetting by a predetermined amount a DC voltage component in said signal proportional to said measure.

13. The DC:DC converter of claim 1, wherein:

said DC:DC converter is a step-down converter, and said switch is a transistor.

14. A switch mode DC:DC converter having an input node coupleable to a source of potential Vin and having an output node providing an output potential Vo and an output current, comprising:

an inductor having a first inductor node and a second inductor node and an inherent resistance therebetween;

a switch, having a control node, coupled to said converter so as to switchingly control current flow from said input node to said inductor;

a low-pass filter system having a first filter input coupled to said first inductor node and having a second filter input coupled to said second inductor node, an output of said low-pass filter system representing a difference in DC signal components present at said first inductor node and at said second inductor node and providing a measure of said output current; and means, coupled to said output of said low-pass filter system for outputting to said control node a signal proportional to said measure of said output current.

15. The DC:DC converter of claim 14, wherein said signal proportional to said measure is obtained solely from DC-coupled signals available at said first inductor node and at said second inductor node.

16. The DC:DC converter of claim 14, wherein said signal proportional to said measure produces a variation in a duty cycle parameter of said switch.

17. The DC:DC converter of claim 14, wherein said measure of said output current is proportional to an internal temperature of said DC:DC converter.

18. The DC:DC converter of claim 14, wherein said means for outputting includes:

a switch control circuit having an output coupled to said control node so as to control operation of said switch responsive to said measure of said output current.

19. The DC:DC converter of claim 14, wherein:

said low-pass filter system includes:

a first resistor having a first lead coupled to said first inductor node;

a second resistor having a first lead coupled to said second inductor node; and a capacitor coupled between a second lead of said first resistor and a second lead of said second resistor; and said means for outputting includes a difference amplifier having a first input coupled to a second lead of said first resistor, and having a second input coupled to a second lead of said second resistor.

20. The DC:DC converter of claim 14, wherein:

said low-pass filter system includes:

a first resistor having a first lead coupled to said first inductor node and having a second lead coupled to a first lead of a first capacitor;

a second resistor having a first lead coupled to said second inductor node and having a second lead coupled to a first lead of a second capacitor; and said means for outputting includes a difference amplifier having a first input coupled to said second lead of said first resistor, having a second input coupled to a second lead of said second resistor, and having an output providing said signal proportional to said measure of said output current.

21. The DC:DC converter of claim 14, further including:

means for offsetting by a predetermined amount a DC voltage component in said signal proportional to said measure.

22. The DC:DC converter of claim 14, wherein:

said DC:DC converter is a step-down converter, and said switch is a transistor.

23. A method of sensing output current to protect a DC:DC switch mode converter against overload, in which the switch mode DC:DC converter includes an input node coupleable to a source of potential Vin, an output node providing an output potential Vo and an output current, an inductor having a first inductor node and a second inductor node and an inherent resistance therebetween, and further includes a switch, having a control node, coupled to said converter so as to switchingly control current flow from said input node to said inductor, the method comprising the following steps:

(a) sensing DC signal components without sensing substantial AC signal components at said first inductor node and at said second inductor node;

(b) differentially comparing signals sensed at step (a) to obtain a drive signal that provides a measure of at least one of (i) said output current and (ii) temperature within said converter; and (c) coupling said drive signal obtained at step (b) to said control node of said switch.

24. The method of claim 23, wherein:

step (a) includes low-pass filtering signal components present at said first inductor node and present at said second inductor node.

25. The method of claim 24, wherein:

step (b) includes differentially comparing low-pass filtered signals obtained at step (a).

26. The method of claim 25, wherein:

step (c) causes said switch to produce a variation in a duty cycle parameter of said switch.

27. The method of claim 23, further including:

offsetting by a predetermined amount a DC voltage component in said signal proportional to said measure.

* * * * *